United States Patent [19]

Chang et al.

[11] Patent Number: 5,624,982

[45] Date of Patent: Apr. 29, 1997

[54] STABILIZER SYSTEM FOR NON YELLOWING POLYMER COMPOSITION

[75] Inventors: Moh C. O. Chang, Feeding Hills; Chuan-Ju Chen, Amherst; Allen R. Padwa, Worcester, all of Mass.

[73] Assignee: Bayer Antwerpen SA/NV, Antwerp, Belgium

[21] Appl. No.: 550,313

[22] Filed: Oct. 30, 1995

Related U.S. Application Data

[63] Continuation-in-part of Ser. No. 370,088, Jan. 9, 1995, Pat. No. 5,492,948, which is a continuation-in-part of Ser. No. 160,138, Dec. 2, 1993, abandoned.

[51] Int. Cl.$^6$ ..................................................... C08K 5/34
[52] U.S. Cl. .......................... 524/91; 524/99; 524/100; 524/101; 524/301; 524/303; 252/400.52; 252/403; 252/406
[58] Field of Search .................. 524/91, 99, 100, 524/101, 301, 303; 252/400.52, 403, 406

[56] References Cited

U.S. PATENT DOCUMENTS

| | | | |
|---|---|---|---|
| 3,531,483 | 9/1970 | Gilles | 524/101 |
| 4,331,586 | 5/1982 | Hardy | 524/97 |
| 4,464,496 | 8/1984 | Nemzek et al. | 524/91 |
| 5,004,770 | 4/1991 | Cortolano et al. | 524/99 |
| 5,492,948 | 2/1996 | Chang et al. | 524/100 |

*Primary Examiner*—Kriellion S. Morgan
*Attorney, Agent, or Firm*—Joseph C. Gil; Aron Preis

[57] ABSTRACT

A stabilizer system for the suppression of yellowing in styrenic polymers, consisting essentially of a benzotriazole such as 2-(2'-hydroxy-3',5'-di-tert-amylphenyl) benzotriazole, a hydroxybenzocyanurate such as tris-(3,5-di-tert-butyl-4-hydroxybenzyl)isocyanurate and a hindered amine light stabilizer selected from the group consisting of (i) bis (2,2,6,6,-tetramethyl-4-piperidinyl) sebacate; and (ii) bis-(1,2,2,6,6-pentamethyl-4-piperdinyl) ester of (3,5-di-tert-butyl-4-hydroxybenzyl)-butyl malonate. Additionally a dialkyl thiodipropionate and a zinc dialkyldithiocarbamate may be included in the stabilizer system.

20 Claims, No Drawings

STABILIZER SYSTEM FOR NON YELLOWING POLYMER COMPOSITION

This application is a continuation in part of Ser. No. 08/370,088, filed Jan. 9, 1995, now U.S. Pat. No. 5,492,948 which in turn is a continuation in part of Ser. No. 08/160, 138, filed Dec. 2, 1993, now abandoned.

The present invention relates generally to non-yellowing thermoplastic polymers and more particularly to non-yellowing thermoplastic styrenic polymers containing a stabilizer system.

Styrenic thermoplastic compositions such as ABS compositions and similar styrene-acrylonitrile copolymer blends containing rubbers grafted with styrene-acrylonitrile copolymers exhibit undesirable yellowing which may develop upon storage of the thermoplastics in the dark or on exposure to warm oxidizing aqueous conditions such as occur in warm spas fabricated from such thermoplastic or may be caused by migration of yellow enhancing ingredients from materials in contact with the thermoplastics. Such yellowing is believed to occur due to the transformation of the antioxidants in the thermoplastics to highly chromophoric species. While the antioxidants serve to protect the polymer from oxidation during melt processing and to enhance weatherability and aging resistance, the interaction of the multiple components of antioxidant and UV stabilizer systems can sometimes result in undesirable side reactions which produce yellowing although polymer degradation itself has been impeded.

There is therefore a need for heat stable, weather resistant styrenic thermoplastic compositions capable of being molded into shaped articles possessing an acceptable resistance to the yellowing which can occur upon storage in the dark or upon exposure to yellowing agents.

The present invention provides such compositions comprising a stabilizer system for styrenic polymers, comprising a benzotriazole UV absorber, a hydroxybenzylisocyanurate primary antioxidant, and an oligomeric condensation product of N,N'(2,2,6,6-tetramethylpiperidyl)alkylene diamine and a 6-amino-2,4-dichloro-1,3,5-s-triazine. Optionally a thiodipropionate can be added to function as a secondary antioxidant and a zinc dialkyl-dithiocarbamate can be used to mitigate the yellowing attributed to phenolic antioxidants migrating into the styrenic composition from external sources.

The UV stabilizer can be one or more of the benzotriazole type, especially a hydroxyalkylphenylbenzotriazole as represented by commercially available materials such as 2-(2'-hydroxy-5'-methylphenyl)benzotriazole (Tinuvin P, trademark of Ciba-Geigy), 2-(2'-hydroxy-3', 5'-di-tert butylphenyl)benzotriazole, 2-(2'-hydroxy 3',5'-di-tert butylphenyl)-5-chlorobenzotriazole (Tinuvin 327), 2-(2'-hydroxy 3',5'-di-tert-amylphenyl)benzotriazole (Tinuvin 328), 2-(2'-hydroxy-5'-tert-octylphenyl)benzotriazole (Cyasorb UV5411, trademark of American Cyanamid, Inc.) and the like. The UV stabilizer or stabilizers should be used in sufficient concentration to provide adequate stability against exposure to UV light.

The oligomeric condensation product of a N,N'-(2,2,6, 6-tetramethylpiperidyl)alkylenediamine and a 6-amino-2,4-dichloro-1,3,5,-s-triazine includes those described in U.S. Pat. Nos. 4,086,204 and 4,331,586. The alkylene group of the N,N'-(2,2,6,6-tetramethylpiperidyl)alkylene diamine is advantageously a $C_2$–$C_{20}$ alkylene group which may be straight-chained or branched and may be interrupted by aza, oxa or thia groups. Preferably the alkylene is hexamethylene. The amine group of the 6-amino-2,4-dichloro-1,3,5-s-triazine is derived from a primary or secondary $C_1$–$C_8$ alkylamine or from piperidine or morpholine. Preferably the amine is morpholine. The degree of oligomerization is advantageously in the range of about 1.2 to about 5 to provide an oligomer which is readily dispersed in and compatible with the styrenic polymer.

The hydroxybenzylisocyanurates useful in the present invention include those described in U.S. Pat. No. 3,531, 483. Advantageously the hydroxybenzylisocyanurate is a symmetrical tris-(3,5-di-tert-alkyl-4-hydroxybenzyl) isocyanurate selected from the group consisting of: tris-(3, 5-di-tert-butyl-4-hydroxybenzyl) isocyanurate, tris-(3,5-di-tert-amyl-4-hydroxybenzyl)isocyanurate, tris-(3-tert-butyl-5-t-amyl-4-hydroxybenzyl)isocyanurate, tris [3,5-di-(1-methyl-1-ethylpropyl)-4-hydroxybenzyl]-isocyanurate, tris-[3,5-di-(1,1,2,2-tetramethylpropyl)-4-hydroxybenzyl] isocyanurate, and tris-[3,5-di-(1,1-dimethylpentyl)-4-hydroxybenzyl]isocyanurate to provide a stabilizer system capable of conferring on the styrenic polymer a satisfactory balance of heat stability, weatherability and resistance to yellowing.

Optionally a thiodipropionate may be included in the stabilizer system to act as a secondary antioxidant capable of acting as a hydroperoxide decomposer. In contrast to another commonly used group of secondary antioxidants comprising phoshites and phosphonites, the thiodipropionates when they are included in the stabilizer system for styrenic polymers, inhibit yellowing in the dark. The thiodipropionates however do not effectively reduce yellowing of the styrenic polymer spa materials in contact with warm, antibacterial bleaching solutions used in such spas. The thiodipropionates which may be used to advantage in this aspect of the present invention include the dialkyl thiodipropionates of $C_{12}$–$C_{18}$ alkanols. Distearyl thiodipropionate is a preferred thiodipropionate because of its ease of dispersion in the styrenic polymer and its compatibility therewith.

Another group of compounds which may be used in the present stabilizer system is provided by the dialkyl-dithiocarbamates of zinc. Although they can effectively destroy peroxides and thus inhibit yellowing caused by autoxidation of phenolic stabilizers, they may increase the initial yellowness of styrenic polymers and may impair their weatherability. They are therefore preferably used in low concentration and limited to stabilizer systems for styrenic polymers used indoors and are used advantageously when the stabilized styrenic polymer is likely to come into contact with substrates containing readily autoxidized migratable phenolic stabilizers, since they inhibit yellowing which can result from such autoxidation.

The stabilizer system of the present invention is used in an amount necessary for the requisite degree of stabilization of styrenic polymers and can be used advantageously in concentration of up to 3 weight percent of the styrenic polymer. Advantageously the stabilizer system comprises from about 20 to about 70 parts by weight of the benzotriazole, from about 18 to about 60 parts by weight of the oligomeric condensation product of the N,N'-(2,2,6,6-tetramethylpiperidyl) alkylenediamine and the 6-amino-2,4-dichloro-1,3,5-s-triazine and from about 12 to about 50 parts by weight of the hydroxybenzylisocyanurate. When a thiodipropionate is used, it is added to provide additionally from about 12 to about 40 parts by weight of the stabilizer system. The dialkyldithiocarbamate can be added to provide additionally from about 3 to about 8 parts by weight of the stabilizer system provided that the amount of dialkyldithiocarbamate in the stabilized styrenic polymer is not more than 0.1 weight percent.

The styrenic thermoplastic polymer may be selected from the group consisting of polystyrene, styrene-acrylonitrile copolymer, α-methylstyrene-acrylonitrile copolymer, acrylonitrile-butadiene-styrene copolymer, acrylonitrile-butadiene-α-methylstyrene copolymer, acrylonitrile-styrene-($C_3$-$C_{10}$ alkyl acrylate) copolymer, methacrylate-butadiene-styrene copolymer, styrene-methyl methacrylate copolymer, polystyrene blended with a polybutadiene to which styrene has been grafted, styrene-acrylonitrile copolymer blended with a poly($C_3$ to $C_{10}$ alkyl acrylate) rubber grafted with a styrene-acrylonitrile copolymer, styrene-acrylonitrile copolymer blended with a polybutadiene rubber grafted with a styrene-acrylonitrile copolymer, styrene-acrylonitrile copolymer blended with an ethylene-propylene-diene copolymer rubber grafted with a styrene-acrylonitrile copolymer, styrene-methyl methacrylate copolymer blended with a poly($C_3$ to $C_{10}$ alkyl acrylate) rubber grafted with a styrene-methyl methacrylate copolymer, styrene-methyl methacrylate copolymer blended with a polybutadiene grafted with a styrene-methyl methacrylate copolymer and styrene-methyl methacrylate copolymer blended with an ethylene-propylene-diene rubber grafted with a styrene methyl methacrylate copolymer.

Preferably the styrenic polymer is selected from the group consisting of styrene-acrylonitrile copolymer, acrylonitrile-butadiene-styrene copolymer, styrene-acrylonitrile copolymer blended with a polybutadiene grafted with a styrene-acrylonitrile copolymer, styrene-acrylonitrile copolymer blended with a poly($C_3$ to $C_{10}$ alkyl acrylate) rubber grafted with a styrene-acrylonitrile copolymer and styrene-acrylonitrile copolymer blended with an ethylene-propylene-diene copolymer rubber grafted with a styrene-acrylonitrile copolymer.

The components of the stabilizer system can be added together or separately to the styrenic polymer and blended therein by any conventional melt blending process. Alternatively, in the preparation of styrenic polymer polyblends, individual components of the stabilizer system may be added in whole or in part to one or more individual polymer components of the polyblend either during the manufacture of such polymer components or prior to introduction of such polymer components into the polyblend.

In addition to the stabilizer system, other additives such as impact modifiers, pigments, fillers, lubricants and flow aids may be included in the thermoplastic styrenic polymer provided such additives do not significantly affect the yellowing which can develop in the dark or in the presence of oxidation environments.

The stabilizer system of the present invention and its stabilizing effect on styrenic polymers is further illustrated but not limited by the examples set forth below.

WORKING EXAMPLES

In the working examples set forth below, the following components are used:

| | |
|---|---|
| ASA - | a poly(butyl acrylate) rubber grafted with a styrene-acrylonitrile copolymer. The weight ratio of rubber to graft copolymer is 10:12; the weight ratio of styrene to acrylonitrile is 68:32 |
| AES - | an ethylene propylene diene rubber grafted with styrene-acrylonitrile copolymer supplied by Uniroyal under the tradename Royaltuff 372 |
| SAN - | a copolymer of 68 weight percent styrene and 32 weight percent acrylonitrile |
| Tinuvin 328[a] | 2-(2'-hydroxy-3',5'-di-tert-amylphenyl)benzotriazole |
| Cyasorb - UV531[b] | 2-hydroxy-4-n-octyloxybenzophenone |
| Cyasorb - UV5411 | 2-(2'-hydroxy-5'-tert-octylphenyl) benzotriazole |
| Tinuvin 144 - | bis-(1,2,2,6,6-pentamethyl-4-piperdinyl) ester of (3,5-di-tert-butyl-4-hydroxybenzyl)-butyl malonate |
| Tinuvin 622LD- | polymer of dimethyl succinate and 2,2,6,6-tetramethyl-4-hydroxy-1-hydroxyethylpiperidine |
| Tinuvin 765 - | bis(1,2,2,6,6-pentamethyl-4-piperidinyl) sebacate |
| Tinuvin 770 - | bis(2,2,6,6-tetramethyl-4-piperidinyl) sebacate |
| Cyasorb - UV3346 | an oligomeric condensate of N,N'-(2,2,6,6-tetramethylpiperidyl) hexamethylene diamine and 2,4-dichloro-6-morpholino-1,3,5-s-triazine, wherein the degree of oligomerization is about 2.0 to 2.5 |
| Ionol[c] - | 2,6-di-tert-butyl-p-cresol |
| Irganox 1076 - | octadecyl 3,5-di-tert-butyl-4-hydroxy-hydrocinnamate |
| Irganox 1010 - | tetrakis[(3,5-di-tert-butyl-4-hydroxy hydrocinnamoyloxymethyl)] methane |
| Irganox 3114 - | tris(3,5-di-tert-butyl-4-hydroxybenzyl)isocyanurate |
| Irganox - MD1024 | 1,2-bis(3,5-di-tert-butyl-4-hydroxy-hydrocinnamoyl) hydrazine |
| Irganox 1035 - | thioethylene bis(3,5-di-tert-butyl-4-hydroxy hydrocinnamate) |
| Irganox 1098 - | N,N'-hexamethylene bis(3,5-di-tert-butyl-4-hydroxy hydrocinnamate) |
| Ethanox 330[d] - | 1,3,5-trimethyl-2,4,6-tris(3,5-di-tert-butyl-4-hydroxybenzyl)benzene |
| Topanol CA[e] - | 1,1,3-tris(2-methyl-4-hydroxy-5-tert-butylphenyl)butane |
| Santonox R[f] - | 4,4'-thio-bis(6-tert-butyl-m-cresol) |
| Naugard P[g] - | tris(p-nonylphenyl) phosphite |
| Naugard 445 - | 4,4' di(α,α-dimethyl benzyl) diphenylamine |
| Irgafos 168[a] - | tris(2,4-di-tert-butylphenyl) phosphite |
| Weston 618[h] - | distearyl pentaerythritol diphosphite |
| Ethanox 398 - | 2,2'-ethylidene bis(4,6-di-tert-butylphenyl) fluorophosphonite |
| Sandostab - P-EPQ[i] | tetrakis(2,4-di-tert-butylphenyl) 4,4'-biphenylene diphosphonite |
| Cyanox 711[b] - | di-(tridecyl) thiodipropionate |
| DSTDP - | distearyl thiodipropionate |
| Ethyl - Zimate[j] | zinc diethyl dithiocarbamate |
| Zn St - | zinc stearate |
| Ti-Pure - R101[k] | rutile titanium dioxide (97%) |
| Tioxide - TR63[l] | rutile titanium dioxide (92%) |

Registered trademarks:
[a]Ciba-Geigy Corporation
[b]American Cyanamid Company
[c]Neville Chemical Company
[d]Ethyl Corporation
[e]Imperial Chemical Industries, plc.
[f]Monsanto Company
[g]Morton Thiokol Corporation
[h]General Electric Company
[i]Sandoz Corporation
[j]R. T. Vanderbilt Company, Inc.
[k]E. I. duPont de Nemours and Company, Inc.
[l]Tioxide Company

PREPARATION OF TEST SAMPLES

Polymer blends containing stabilizer systems are prepared by adding the ingredients of the blend to a Banbury mixer of 3.4 kg capacity operated to provide a dump temperature of 205° to 210° C. The circulating oil temperature is about 105° C., the rotor speed is 110 rpm, the ram weight air pressure is 482 kPa, the mill roll front pressure is 517 kPa and the back pressure is 413 kPa. The blend is extruded and pelletized in a Cumberland pelletizer set at 6 out of 10 scale. Injection molded plaques 7.62 cm×10.2 cm are prepared from the pellets using an Engel injection molding machine operated at a stock temperature of 257° C., injection speed of 5.08 cm per second. The injection time is approximately 2.2 seconds, cooling time 10 seconds, holding time 10 seconds, back pressure 1000 kPa, screw refill speed 43 percent of full speed and screw refill stroke 6.35 cm with 0.38 cm cushion.

EVALUATION OF YELLOWING IN THE DARK (YID)

Without prior light exposure, the polyblends do not yellow in the dark. Therefore a standard pre-exposure of test samples to light is carried out by the method described in ASTM D2565-89. The Atlas Model Ci65 Weather-Ometer is used. The light source is Xenon arc with borosilicate/borosilicate inner and outer fillers. The irradiance is 0.35 watt/m$^2$ at 340 nm wavelength. The black panel temperature is controlled at 63°±3° C. The continuous light-on cycle procedure is used with intermittent water spray providing relative humidity in the range of 30 to 100%.

The yellowness index (b) of the test samples is measured before ($b_o$) and after UV exposure of 50 kJ.m$^{-2}$($b_b$). The samples are then aged in the dark in an air circulated oven at 60° C. and the yellowness index ($b_a$) is determined at increasing intervals of time. The change in yellowness index versus $b_b$ and $b_o$ is denoted by (db)$_{ab}$ and (db)$_{ao}$ respectively.

EVALUATION OF SPA UNDER WATER YELLOWING (SUWY)

A 34 liter glass tank filled with pump-circulated solution of Bioguard (sodium dichloro-s-triazinetrione) maintained at 40° C. and an active chlorine and chloride level of 25±5 ppm is used in the determination of SUWY. The test is done in a laboratory hood. Indoor ambient light exposure of approximately 12 hours per day is applied. Without such exposure, no yellowing occurs. The test samples are placed in the tank and the yellowness index (b) is determined at intervals of time.

WEATHERABILITY

Weatherability is judged by the difference in impact resistance of samples exposed to accelerated weathering conditions and control examples not so exposed. Exposure is carried out under the conditions set forth in ASTM 2565-89. Results are expressed as follows:

| Rating | % Retention of Impact Strength |
|---|---|
| 5 | 90–100 |
| 4 | 80–90 |
| 3 | 65–80 |
| 2 | 50–55 |
| 1 | 35–50 |
| 0 | <35 |

EFFECT OF HINDERED PHENOLIC ANTIOXIDANT

A series of polyblends comprising 96.1 parts by weight of a blend of 55.6 parts by weight of ASA, 44.4 parts by weight of SAN, 0.30 parts by weight of hindered phenolic antioxidant, 0.75 parts by weight of Tinuvin 328, 0.75 parts by weight of Tinuvin 770, 2 parts by weight of 2-(2-butoxyethoxy)ethanol, 0.1 part by weight of Dow Corning DC200 silicone oil and 6 parts by weight of Ti-Pure R101 titanium dioxide are blended in the Banbury mixer and injection molded to provide test samples. The data for YID and SUWY after 14 days are presented in Table 1.

TABLE 1

EFFECT OF HINDERED PHENOLIC ANTIOXIDANT

| Example | Hindered Phenolic Antioxidant | $b_o$ | (db)$_{ao}$ | (db)$_{ab}$ | SUWY db |
|---|---|---|---|---|---|
| 1 | None | 6.41 | −1.68 | 1.14 | 0.40 |
| 2 | Ionol | 6.62 | 2.38 | 5.07 | 1.57 |
| 3 | Irganox 1076 | 6.75 | −1.42 | 1.37 | 3.13 |
| 4 | Irganox 1010 | 7.15 | −1.36 | 1.65 | 1.12 |
| 5 | Irganox 3114 | 6.72 | −1.77 | 1.05 | 0.76 |
| 6 | Ethanox 330 | 6.82 | −0.16 | 2.43 | 1.12 |
| 7 | Topanol CA | 7.04 | −1.51 | 1.25 | 1.20 |
| 8 | Santanox R | 6.92 | −0.60 | 1.42 | 1.65 |
| 9 | Irganox MD1024 | 6.22 | −0.88 | 1.46 | 0.80 |
| 10 | Irganox 1035 | 6.06 | −0.87 | 1.61 | 2.79 |
| 11 | Irganox 1098 | 6.12 | −0.99 | 1.55 | 1.34 |

The data demonstrate that Ionol and Irganox 1076 confer the worst YID and SUWY respectively. The formulation containing no phenolic antioxidant yellows least. Among the formulations containing phenolic antioxidant, the formulation containing Irganox 3114 showed the least yellowing in both the YID and SUWY tests.

EFFECT OF BENZOTRIAZOLE UV ABSORBER

A series of poyblends is prepared comprising 30.3 parts by weight of ASA, 36.5 parts by weight of AES, 24.3 parts by weight SAN, 2 parts by weight of 2-(2-butoxyethoxy)ethanol, 0.1 part by weight of Dow Corning DC200 silicone oil, 6 parts by weight of Ti-Pure R101 titanium oxide and 0.75 parts by weight of benzotriazole UV absorber. The data for YID and SUWY of the polyblends are set forth in Table II.

TABLE II

EFFECT OF BENZOTRIAZOLE UV ABSORBER

| Example | Benzotriazole | $b_o$ | $(db)_{ao}$ | $(db)_{ab}$ | SUWY db |
|---|---|---|---|---|---|
| 12 | Tinuvin 328 | 6.91 | −1.72 | 1.47 | 0.32 |
| 13 | Cyasorb UV5411 | 6.83 | −1.74 | 1.45 | 0.98 |
| 14 | Cyasorb UV531 | 7.27 | −1.83 | 1.42 | 0.29 |

The data show that a benzotriazole UV absorber makes little contribution to YID. Tinuvin 328 and Cyasorb UV531 are superior to Cyasorb UV5411 in the SUWY test.

EFFECT OF HINDERED AMINE LIGHT STABILIZER

A series of polyblends is prepared comprising 30.0 parts by weight of ASA, 36.0 parts by weight of AES, 24.0 parts by weight of SAN, 2 parts by weight of 2-(2-butoxyethoxy) ethanol, 0.1 part by weight of Dow Corning DC200 silicone oil, 6 parts by weight of Ti-Pure R101 titanium oxide, 0.75 parts by weight of Tinuvin 328, 0.3 parts by weight of Irganox 1076 and 0.75 parts by weight of hindered amine light stabilizer (HALS). The YID and SUWY data for the polyblends are presented in Table III.

TABLE III

EFFECT OF HALS

| Example | HALS | $b_o$ | $(db)_{ao}$ | $(db)_{ab}$ | SUWY db |
|---|---|---|---|---|---|
| 15 | None | 7.08 | −1.59 | 1.53 | 0.58 |
| 16 | Tinuvin 144 | 7.10 | −0.31 | 2.79 | 7.10 |
| 17 | Tinuvin 622LD | 7.42 | −1.54 | 1.70 | 0.57 |
| 18 | Tinuvin 765 | 7.16 | 0.25 | 3.35 | 2.85 |
| 19 | Tinuvin 770 | 7.54 | 3.18 | 6.52 | 3.36 |
| 20 | Cyasorb UV3346 | 7.55 | −1.26 | 2.24 | 2.11 |

This series of screening experiments was conducted with Irganox 1076, one of the worst offenders for its contribution to YID and SUWY, to ensure differentiation between the various HALS. In general the addition of HALS increases the yellowing index of the polyblend. Tinuvin 622LD imparts the lowest degree of yellowing. Cyasorb 3346 is about equivalent to Tinuvin 622LD in its contribution to YID, and its contribution to SUWY is significantly less than that of the other HALS except Tinuvin 622LD. Unfortunately Tinuvin 622LD provides poor weatherability to styrenic polymers because of its incompatibility. Hence Cyasorb 3346 was selected for stabilizer systems comprising the best performing phenolic antioxidant, Irganox 3114.

EFFECT OF SECONDARY ANTIOXIDANT

A series of polyblends is prepared comprising 29.9 parts by weight of ASA, 35.9 parts by weight of AES, 24.0 parts by weight of SAN, 2 parts by weight of 2-(2-butoxyethoxy) ethanol, 0.1 part by weight of Dow Corning DC200 silicone oil, 6 parts by weight of Ti-Pure titanium dioxide, 0.75 parts by weight of Tinuvin 328, 0.75 parts by weight of Tinuvin 144, 0.3 parts by weight of Ionol and 0.3 parts by weight of secondary antioxidant. The YID and SUWY data of the polyblends are set forth in Table IV.

TABLE IV

EFFECT OF SECONDARY ANTIOXIDANT

| Example | Secondary Antioxidant | $b_o$ | $(db)_{ao}$ | $(db)_{ab}$ | SUWY db |
|---|---|---|---|---|---|
| 21 | None | 6.94 | 13.07 | 15.91 | 2.83 |
| 22 | Naugard P | 6.84 | 11.84 | 14.66 | 3.84 |
| 23 | Irgafos 168 | 6.90 | 12.86 | 15.75 | 1.60 |
| 24 | Weston 618 | 6.83 | 16.23 | 19.01 | 1.68 |
| 25 | Ethanox 398 | 6.91 | 14.20 | 17.13 | 1.84 |
| 26 | Santostab P-EPQ | 6.97 | 17.29 | 20.20 | 1.17 |
| 27 | DSTDP | 7.01 | 1.12 | 4.04 | 2.29 |
| 28 | Irganox MD1024 | 6.73 | 10.34 | 13.07 | 2.76 |
| 29 | Naugard 445 | 6.93 | 16.44 | 18.26 | 2.18 |
| 30 | Ethyl Zimate | 10.24 | −2.20 | 2.05 | 0.59 |
| 31 | Zn St | 8.33 | 13.23 | 16.32 | 1.38 |
| 32 | Cyanox 711 | 6.64 | 1.54 | 4.28 | 2.27 |

In this series of screening experiments 0.3 parts of Ionol is added to the polyblend with the deliberate intention of causing yellowing and finding secondary antioxidants which inhibit such yellowing from undesirable phenolic antioxidants which may be present in polyblend components or may migrate from materials in contact with the polyblends. Although phosphites and phosphonites are commonly suggested to inhibit phenolic antioxidant yellowing, none of them (Examples 22 to 24 using phoshites and Examples 25 and 26 using phosphonites) are effective in the present system and indeed some of them intensify the yellowing. DSTDP and Cyanox 711 decrease YID of the polyblends but are ineffective in reducing SUWY. Dithiocarbamates such as Ethyl Zimate are very effective in decreasing YID and SUWY, however initial yellowness is increased.

EFFECT OF EHTYL ZIMATE ON INITIAL YELLOWING

A series of polyblends of composition similar to the series of table IV but containing various amounts of Ethyl Zimate is prepared. The initial yellowness data are presented in Table V.

TABLE V

EFFECT OF ETHYL ZIMATE CONCENTRATION ON INITIAL YELLOWNESS, YID AND SUWY

| Example | Concentration of Ethyl Zimate, % | $b_o$ | $(db)_{ao}$ | $(db)_{ab}$ | SUWY db |
|---|---|---|---|---|---|
| 33 | 0.3 | 10.24 | −2.20 | 2.05 | 0.59 |
| 34 | 0.1 | 8.10 | 3.75 | 7.04 | 1.32 |
| 35 | 0.05 | 7.75 | 6.50 | 9.48 | — |
| 36 | 0.025 | 6.95 | 7.56 | 10.31 | — |
| 37 | 0.0 | 6.94 | 13.07 | 15.91 | 2.83 |

While the initial yellowing of the polyblend is reduced with lower concentration of Ethyl Zimate the ability to inhibit the YID and SUWY caused by antioxidants such as Ionol which generate highly colored oxidation products is lessened.

COMPARISON OF STABILIZER SYSTEMS

A statistical experimental design is performed to determine superior stabilizer systems for a polyblend of 33.3 parts by weight of ASA, 40 parts by weight of AES, 26.7 parts by weight of SAN, 7.5 parts by weight of Tioxide TR-63 titanium dioxide, 2 parts by weight of 2-(2- butoxyethoxy)ethanol, 0.1 parts by weight of Dow Corning DC 200 silicone oil and up to about 2 parts by weight of stabilizer system. From the data generated, the stabilizer systems listed in Table VI are rated for $(db)_{ao}$, $(db)_{ab}$ after 14 days of YID and for db after 14 days of SUWY and for weatherability. In the ratings 5 is highest and 0 is lowest.

TABLE VI

COMPARISON OF STABILIZER SYSTEMS

| Stabilizer | Example |  |  |  |  |  |  |
|---|---|---|---|---|---|---|---|
|  | 38 | 39 | 40 | 41 | 42 | 43 | 44 |
| Tinuvin 328 | 1.2 | 1.2 | 0.75 | 1.2 | 0.4 | 0.95 | 1.2 |
| Tinuvin 144 | — | — | 0.75 | 0.3 | 0.8 | — | — |
| Cyasorb 3346 | — | — | — | — | — | 0.55 | 0.3 |
| Irganox 3114 | 0.6 | 0.5 | 0.3 | 0.3 | 0.6 | 0.3 | 0.3 |
| DSTDP | — | — | — | — | — | — | — |
| Et Zimate | — | 0.1 | — | — | — | — | — |
| $(db)_{ao}$ | 5 | 5 | 0 | 4 | 1 | 0 | 4 |
| $(db)_{ab}$ | 5 | 5 | 2 | 3 | 1 | 1 | 4 |
| (db) SUWY | 5 | 5 | 1 | 4 | 3 | 5 | 5 |
| Weatherability | 3 | 2 | 5 | 5 | 5 | 5 | 5 |

TABLE VI

COMPARISON OF STABILIZER SYSTEMS. CONT.

| Stabilizer | Example |  |  |  |  |  |
|---|---|---|---|---|---|---|
|  | 45 | 46 | 47 | 48 | 49 | 50 |
| Tinuvin 328 | 0.4 | 0.4 | 0.4 | 0.4 | 0.75 | 0.75 |
| Tinuvin 144 | 0.8 | — | 0.4 | — | 0.35 | — |
| Cyasorb 3346 | — | 0.8 | 0.4 | 0.5 | — | 0.35 |
| Irganox 3114 | 0.3 | 0.3 | 0.3 | 0.6 | 0.3 | 0.3 |
| DSTDP | 0.3 | 0.3 | 0.3 | 0.3 | 0.3 | 0.3 |
| Et Zimate | — | — | — | — | 0.1 | 0.1 |
| $(db)_{ao}$ | 4 | 5 | 2 | 5 | 5 | 5 |
| $(db)_{ab}$ | 4 | 4 | 2 | 5 | 5 | 5 |
| (db) SUWY | 4 | 5 | 3 | 3 | 3 | 4 |
| Weatherability | 5 | 5 | 5 | 5 | 2 | 2 |

Examples 38 and 39 containing Tinuvin 328 and Irganox 3114 have superior yellowness response but poor weatherability especially when Ethyl Zimate is present. The introduction of HALS Tinuvin 144 improves weatherability but with adverse effect on yellowing performance (Examples 40–42, 45, 47, 49). The addition of DSTDP to the stabilizer system gives some improvement in yellowing performance (Example 45 vs Example 42). However a better balance in yellowing performance and weatherability is achieved with the system containing Cyasorb UV3346 (Examples 44, 46 and 48). While weatherability is decreased by the Ethyl Zimate of Example 50, the composition is of value for indoor applications particularly where it may come in contact with hindered phenolic antioxidants such as Ionol capable of generating highly colored chromophores.

We claim:

1. A stabilizer system for styrene polymers consisting essentially of (a) a benzotriazole; (b) a hindered amine light stabilizer selected from the group consisting of (i) bis (2,2,6,6-tetramethyl-4-piperidinyl) sebacate; and (ii) bis-(1, 2,2,6,6-pentamethyl-4-piperdinyl) ester of (3,5-di-tert- butyl-4-hydroxybenzyl)-butyl malonate; and (c) tris (3,5-di-tert-butyl-4-hydroxybenzyl) isocyanurate with the proviso that the stabilizer system does not contain phosphites or phosphonites stabilizers.

2. The stabilizer system of claim 1 wherein the hindered amine light stabilizer is bis-(1,2,2,6,6-pentamethyl-4-piperdinyl) ester of (3,5-di-tert-butyl-4-hydroxybenzyl)-butyl malonate.

3. The stabilizer system of claim 1 wherein the hindered amine light stabilizer is bis(2,2,6,6-tetramethyl-4-piperidinyl) sebacate.

4. The stabilizer system of claim 1 comprising (a) from about 20 to about 70 parts by weight of the benzotriazole; (b) from about 18 to about 60 parts by weight of the indered amine light stabilizer; and (c) from about 12 to about 50 parts by weight of the hydroxybenzylisocyanurate.

5. The stabilizer system of claim 1 wherein the benzotriazole is selected from the group consisting of: 2-(2'-hydroxy-3',5'-di-tert-butylphenyl)-benzotriazole, 2-(2'-hydroxy-3',5'-di-tert-amylphenyl)-benzotriazole, 2-(2'-hydroxy-5'-tert-butylphenyl) benzotriazole, 2-(2'-hydroxy-5'-tert-amylphenyl) benzotriazole, and 2-(2'-hydroxyl-5'-tert-octylphenyl) benzotriazole.

6. The stabilizer system of claim 1 wherein the benzotriazole is 2-(2'-hydroxy-3',5'-di-tert-amylphenyl) benzotriazole.

7. The stabilizer system of claim 1 additionally containing a thiodipropionate.

8. The stabilizer system of claim 2 additionally containing from about 12 to about 40 parts by weight of a thiodipropionate.

9. The stabilizer system of claim 3 additionally containing a dialkyl thiodipropionate of a $C_{12}$–$C_{18}$ alkanol.

10. The stabilizer system of claim 5 additionally containing a zinc dialkyldithiocarbamate wherein the alkyl groups are $C_1$–$C_8$ alkyls.

11. A styrenic polymer stabilized with the stabilizer system of claim 1.

12. A styrenic polymer stabilized with the stabilizer system of claim 2.

13. A styrenic polymer stabilized with the stabilizer system of claim 3.

14. A styrenic polymer stabilized with the stabilizer system of claim 4.

15. A styrenic polymer stabilized with the stabilizer system of claim 5.

16. A styrenic polymer stabilized with the stabilizer system of claim 6.

17. A styrenic polymer stabilized with the stabilizer system of claim 7.

18. A styrenic polymer stabilized with the stabilizer system of claim 8.

19. The styrenic polymer of claim 9 selected from the group consisting of polystyrene, styrene-acrylonitrile copolymer, α-methylstyrene-acrylonitrile copolymer, acrylonitrile-butadiene-styrene copolymer, acrylonitrile-butadiene-α-methylstyrene copolymer, acrylonitrile-styrene-($C_3$–$C_{10}$ alkyl acrylate) copolymer, methacrylate-butadiene-styrene copolymer, styrene-methyl methacrylate copolymer, polystyrene blended with a polybutadiene to which styrene has been grafted, styrene-acrylonitrile copolymer blended with a poly($C_3$ to $C_{10}$ alkyl acrylate) rubber grafted with a styrene-acrylonitrile copolymer, styrene-acrylonitrile copolymer blended with a polybutadiene rubber grafted with a styrene-acrylonitrile copolymer, styrene-acrylonitrile copolymer blended with an ethylene-propylene-diene copolymer rubber grafted with a styrene-acrylonitrile copolymer, styrene-methyl methacrylate copolymer blended with a poly($C_3$ to $C_{10}$ alkyl acrylate) rubber grafted with a styrene-methyl methacrylate copolymer, styrene-methyl methacrylate copolymer blended with a polybutadiene grafted with a styrene-methyl methacrylate copolymer and styrene-methyl methacrylate copolymer blended with an ethylene-propylene-diene rubber grafted with a styrene methyl methacrylate copolymer.

20. The styrenic polymer of claim 9 wherein the styrenic polymer is selected from the group consisting of styrene-acrylonitrile copolymer, acrylonitrile-butadiene-styrene copolymer, styrene-acrylonitrile copolymer blended with a polybutadiene grafted with a styrene-acrylonitrile copolymer, styrene-acrylonitrile copolymer blended with a poly($C_3$ to $C_{10}$ alkyl acrylate) rubber grafted with a styrene-acrylonitrile copolymer and styrene-acrylonitrile copolymer blended with an ethylene-propylene-diene copolymer rubber grafted with a styrene-acrylonitrile copolymer.

* * * * *